United States Patent
Bolle et al.

(10) Patent No.: US 10,306,510 B2
(45) Date of Patent: May 28, 2019

(54) BANDWIDTH LIMITATION OF NON-GBR BEARERS

(71) Applicant: TELEFONAKTIEBOLAGET LM ERICSSON (PUBL), Stockholm (SE)

(72) Inventors: Aldo Bolle, Västra Frölunda (SE); Victor Manuel Avila Gonzalez, Madrid (ES); Sven-Ove Emanuelsson, Nol (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 261 days.

(21) Appl. No.: 15/100,937

(22) PCT Filed: Dec. 3, 2013

(86) PCT No.: PCT/EP2013/075381
§ 371 (c)(1),
(2) Date: Jun. 1, 2016

(87) PCT Pub. No.: WO2015/081989
PCT Pub. Date: Jun. 11, 2015

(65) Prior Publication Data
US 2016/0302101 A1    Oct. 13, 2016

(51) Int. Cl.
*H04W 28/02* (2009.01)
*H04L 12/859* (2013.01)
(Continued)

(52) U.S. Cl.
CPC ..... *H04W 28/0257* (2013.01); *H04L 12/1407* (2013.01); *H04L 47/20* (2013.01);
(Continued)

(58) Field of Classification Search
None
See application file for complete search history.

(56) References Cited

U.S. PATENT DOCUMENTS

2007/0281699 A1* 12/2007 Rasanen ........... H04W 36/0038
455/436
2010/0214977 A1* 8/2010 Hegde ................ H04W 28/18
370/328
(Continued)

FOREIGN PATENT DOCUMENTS

WO    2010020637 A1    2/2010

OTHER PUBLICATIONS

International Search Report and Written Opinion dated Aug. 29, 2014, in International Application No. PCT/EP2013/075381, 11 pages.
(Continued)

*Primary Examiner* — Edan Orgad
*Assistant Examiner* — Emmanuel K Maglo
(74) *Attorney, Agent, or Firm* — Rothwell, Figg, Ernst & Manbeck, P.C.

(57) ABSTRACT

There is provided bandwidth limitation of a connectivity service for a user equipment with respect to an access point name (APN) served by a packet data gateway (PGW) in a communications network. The PGW receives a request to separate bandwidth limitation with respect to the APN for a connectivity service and a specific service delivered over the connectivity service. The PGW enforces a first bandwidth limitation on the connectivity service. The PGW enforces a second bandwidth limitation on the specific service.

32 Claims, 6 Drawing Sheets

(51) Int. Cl.
*H04L 12/813* (2013.01)
*H04L 12/815* (2013.01)
*H04L 12/14* (2006.01)

(52) U.S. Cl.
CPC .......... *H04L 47/22* (2013.01); *H04L 47/2475* (2013.01); *H04W 28/0268* (2013.01)

(56) References Cited

U.S. PATENT DOCUMENTS

| | | | | |
|---|---|---|---|---|
| 2011/0138066 | A1* | 6/2011 | Kopplin | H04L 47/10 709/228 |
| 2011/0219426 | A1* | 9/2011 | Kim | H04L 41/5058 726/1 |
| 2012/0076125 | A1* | 3/2012 | Kopplin | H04W 8/06 370/338 |
| 2013/0077503 | A1* | 3/2013 | Chaudhuri | H04W 28/24 370/252 |
| 2013/0084829 | A1* | 4/2013 | De Foy | H04W 12/06 455/411 |
| 2013/0114408 | A1* | 5/2013 | Sastry | H04W 28/02 370/231 |
| 2013/0188527 | A1* | 7/2013 | Yang | H04W 28/22 370/259 |
| 2013/0303114 | A1* | 11/2013 | Ahmad | H04W 16/14 455/406 |
| 2013/0329598 | A1* | 12/2013 | DiFazio | H04W 64/003 370/254 |
| 2013/0343269 | A1* | 12/2013 | Evans | H04W 40/02 370/328 |
| 2014/0004862 | A1* | 1/2014 | Ekemark | H04W 72/06 455/443 |
| 2014/0078899 | A1* | 3/2014 | Zhou | H04L 41/0893 370/230 |
| 2014/0282986 | A1* | 9/2014 | Leung | H04L 63/0807 726/9 |
| 2014/0334303 | A1* | 11/2014 | Ma | H04W 28/0268 370/235 |
| 2014/0349660 | A1* | 11/2014 | Abdalla | H04W 4/70 455/450 |
| 2015/0003435 | A1* | 1/2015 | Horn | H04L 5/0058 370/338 |
| 2015/0009874 | A1* | 1/2015 | Edara | H04W 52/0225 370/311 |
| 2015/0049707 | A1* | 2/2015 | Vajapeyam | H04W 24/10 370/329 |
| 2015/0289167 | A1* | 10/2015 | Alex | H04W 28/24 370/329 |
| 2017/0086090 | A1* | 3/2017 | Sharma | H04W 28/0268 |

OTHER PUBLICATIONS

3rd Generation Partnership Project; Technical Specification Core Network and Terminals; Policy and Charging Control (PCC); Reference points, (Release 11), Universal Mobile Telecommunications System (UMTS); LTE, 3GPP TS 29.212, V11.10.0, 2013, 199 pages.

* cited by examiner

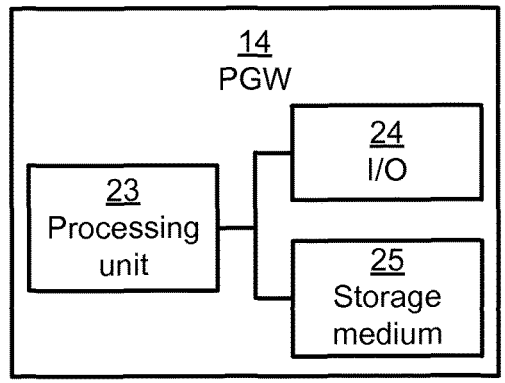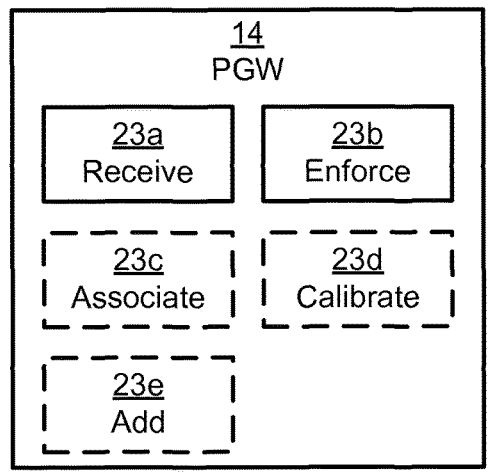
Fig. 2a
Fig. 2b
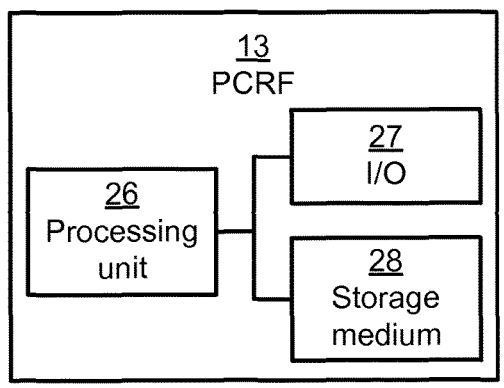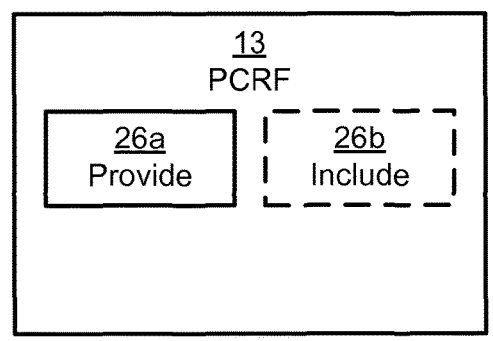
Fig. 3a
Fig. 3b

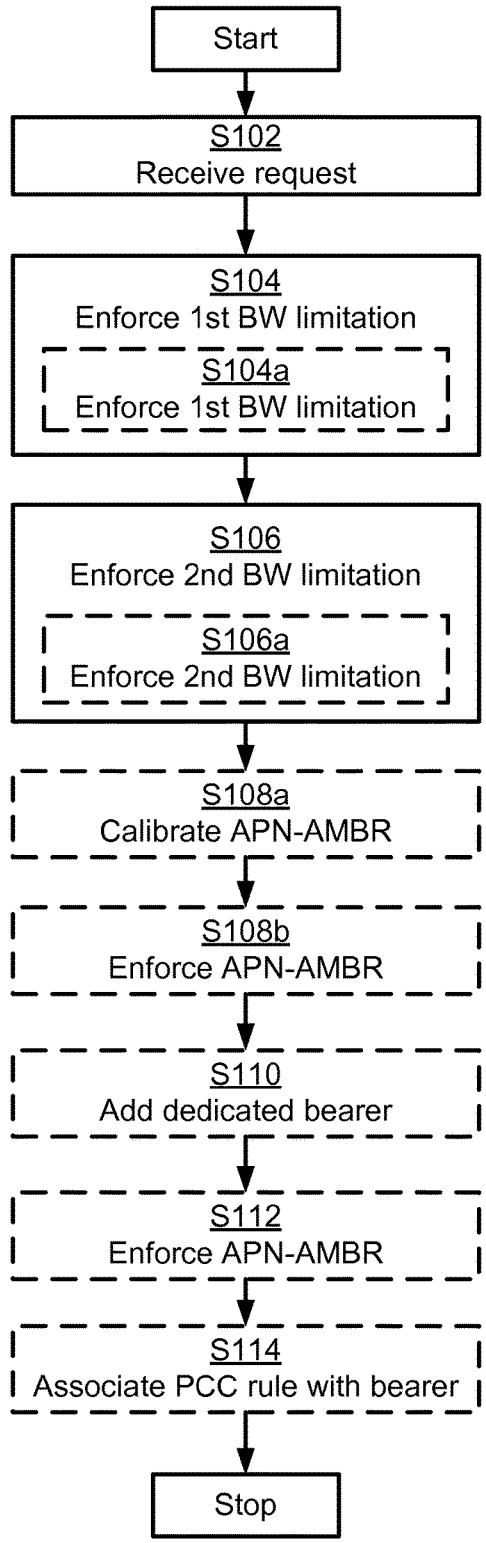
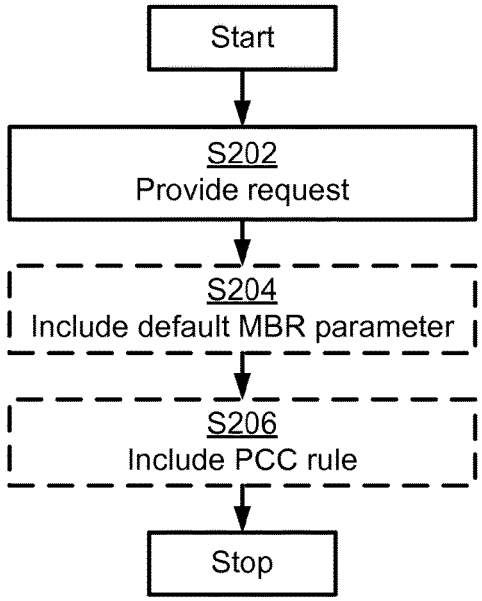
Fig. 7
Fig. 8

BANDWIDTH LIMITATION OF NON-GBR BEARERS

CROSS REFERENCE TO RELATED APPLICATION(S)

This application is a 35 U.S.C. § 371 National Phase Entry Application from PCT/EP2013/075381, filed Dec. 3, 2013, designating the United States, the disclosure of which is incorporated herein in its entirety by reference.

TECHNICAL FIELD

Embodiments presented herein relate to bandwidth limitation of a of a connectivity service, and particularly to methods, a packet data gateway, a policy and charging rules function entity, computer programs, and a computer program product for bandwidth limitation of a connectivity service with respect to an access point name.

BACKGROUND

In mobile communication networks, there is always a challenge to fit together good performance and capacity for a given communications protocol, its parameters and the physical environment in which the communication network is deployed and the willingness to pay for the connectivity provided by the mobile communication network.

Most operators offer Internet connectivity and mobile broadband subscriptions to subscribers at different price levels. Typically the subscriptions are associated with different maximum bit rates (also referred as peak rates). For instance, a first subscription may offer a first maximum bit rate, say 2 Mbps, and have a lower price compared to a second subscription offering a higher maximum bit rate, such as 20 Mbps. Further, operators may apply so called fair usage policies, meaning that the maximum bit rate may be reduced to a lower value, for instance 64 kbps, once a certain volume of data has (over a certain period of time) been consumed by the subscriber.

For mobile broadband subscriptions based on Evolved Packet Core/Long Term Evolution (EPC/LTE) technology, a bandwidth limitation for a user equipment (UE), such as a radio terminal, smart phone, laptop computer, etc., is typically enforced through the Access Point Name-Aggregated Maximum Bit Rate (APN-AMBR) value for a specific APN. This limitation applies to the aggregate of all non-Guaranteed Bit Rate (nonGBR) traffic to/from the subscriber's UE for the specific APN.

Another approach is, for example for the operators, to apply a bandwidth limitation based on Internet Protocol (IP) flows rather than enforcing it at bearer level. This implies that each of the IP flows is throttled to the maximum bit rate specified by the subscription; at the same time the aggregate of the bit rate of all individual IP flows should be kept within the maximum bit rate of the subscription to retain the subscription properties, something that is commonly not achieved.

Sponsored connectivity may be offered on networks, such as the Internet. In general terms, sponsored connectivity or service involves offering to connectivity to specific content charged separately and possibly with a different quality of service (QoS) from the existing subscription being associated with a UE or similar. An example may be the possibility for a subscriber of a UE to watch a video on the UE, streamed or downloaded at a bit rate that is higher than the bit rate offered by the operator according to the existing subscription associated with the UE.

However, in EPC/LTE networks the bandwidth limitation is enforced through the APN-AMBR value, which applies to the aggregate of all nonGBR traffic to/from the UE. FIG. 9 schematically illustrates current enforcement of bearers in the evolved packet system (EPS). LTE is the access part of the EPS.

As a first example, consider a subscriber having a Mobile Broadband (MBB) subscription allowing a peak rate of 2 Mbps, enforced by the APN-AMBR value being applied to the aggregate of all nonGBR traffic to/from the subscriber's UE for a specific APN. Assume that a sponsored service is prepared for delivering a large file with a peak rate of 20 Mbps. If the APN-AMBR for this subscriber is changed to 20 Mbps the subscriber will be able to use the enhanced peak rate of 20 Mbps for accessing any content running on any nonGBR bearer, not only the sponsored service content. Such effects may be denoted as "free ride effects".

As a second example, assume that a subscriber has consumed the quota of data allowed to his/her MBB subscription, with the effect that a fair usage policy with a bandwidth limitation of 64 kbps now applies to his/her subscription, enforced by the APN-AMBR value being applied to the aggregate of all nonGBR traffic to/from the subscriber's UE for a specific APN. If this subscriber would attempt the purchase of the delivery of a video at 2 Mbps, the currently existing possibility to deliver this content would be to modify the APN-AMBR value to 2 Mbps during the delivery of the video. Consequently, if the video is paused, and the subscriber would access other Internet services, his/her internet subscription will not any longer be limited by the fair usage policy.

Hence, there is a need for an improved handling of bandwidth limitation of a Mobile Broadband connectivity service to a user equipment.

SUMMARY

An object of embodiments herein is to provide improved handling of bandwidth limitation of a connectivity service for a user equipment.

According to a first aspect there is presented a method for bandwidth limitation of a connectivity service for a user equipment with respect to an access point name (APN) served by a packet data gateway (PGW) in a communications network. The method is performed by the PGW. The method comprises receiving a request to separate bandwidth limitation with respect to the APN for the connectivity service and a specific service delivered over the connectivity service. The method comprises enforcing a first bandwidth limitation on the connectivity service. The method comprises enforcing a second bandwidth limitation on the specific service.

The connectivity service may be a Mobile Broadband connectivity service or similar. The specific service may be a sponsored service offering connectivity to a specific content charged separately from the existing subscription associated with the user equipment and/or offering connectivity to the specific content with a quality of service (QoS) that is different from the QoS associated with the existing subscription.

Advantageously this provides improved handling of bandwidth limitation of a connectivity service to for user equipment.

Advantageously this provides separation of enforcements of bandwidths for the connectivity service and the specific service.

Advantageously, through the separation of the bit rate limitation imposed at the subscription level from a bandwidth limitation applied for a specific nonGBR service, it is possible to offer a higher maximum bit rate for a specific service/application/flow delivered through a dedicated nonGBR bearer without risking that the bandwidth limitation applied for to a to subscription is removed and thus leading to the "free ride effect".

According to a second aspect there is presented a packet data network gateway (PGW) for bandwidth limitation of a connectivity service for a user equipment with respect to an access point name (APN) served by the PGW in a communications network. The PGW comprises a processing unit. The processing unit is arranged to receive a request to separate bandwidth limitation with respect to the APN for the connectivity service and a specific service delivered over the connectivity service. The processing unit is arranged to enforce a first bandwidth limitation on the connectivity service. The processing unit is arranged to enforce a second bandwidth limitation on the specific service.

According to a third aspect there is presented a computer program for bandwidth limitation of a connectivity service for a user equipment with respect to an access point name (APN) served by a packet data gateway (PGW) in a communications network, the computer program comprising computer program code which, when run on the PGW, causes the PGW to perform a method according to the first aspect.

According to a fourth aspect there is presented a method for bandwidth limitation of a connectivity service for a user equipment with respect to an access point name (APN) served by a packet data gateway (PGW) in a communications network. The method is performed by a policy and charging rules function (PCRF) entity. The method comprises providing a request to the PGW to separate bandwidth limitation with respect to the APN for the connectivity service and a specific service delivered over the connectivity service. The request involves enforcing a first bandwidth limitation on the connectivity service and enforcing a second bandwidth limitation on the specific service.

According to a fifth aspect there is presented a policy and charging rules function (PCRF) entity for bandwidth limitation of a connectivity service for a to user equipment with respect to an access point name (APN) served by a packet data gateway (PGW), in a communications network. The PCRF comprises a processing unit. The processing unit is arranged to provide a request to the PGW to separate bandwidth limitation with respect to the APN for the connectivity service and a specific service delivered over the connectivity service. The request involves enforcing a first bandwidth limitation on the connectivity service and enforcing a second bandwidth limitation on the specific service.

According to a sixth aspect there is presented a computer program for bandwidth limitation of a connectivity service for a user equipment with respect to an access point name (APN) served by a packet data gateway (PGW) in a communications network, the computer program comprising computer program code which, when run on a policy and charging rules function (PCRF) entity, causes the PCRF entity to perform a method according to the fourth aspect.

According to a seventh aspect there is presented a computer program product comprising a computer program according to at least one of the third aspect and the sixth aspect and a computer readable means on which the computer program is stored.

It is to be noted that any feature of the first, second, third, fourth, fifth, sixth, and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 2a is a schematic diagram showing functional modules of a PGW according to an embodiment;

FIG. 2b is a schematic diagram showing functional units of a PGW according to an embodiment;

FIG. 3a is a schematic diagram showing functional modules of a PCRF entity according to an embodiment;

FIG. 3b is a schematic diagram showing functional units of a PCRF entity according to an embodiment;

FIGS. 5, 6, 7, and 8 are flowcharts of methods according to embodiments; and

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
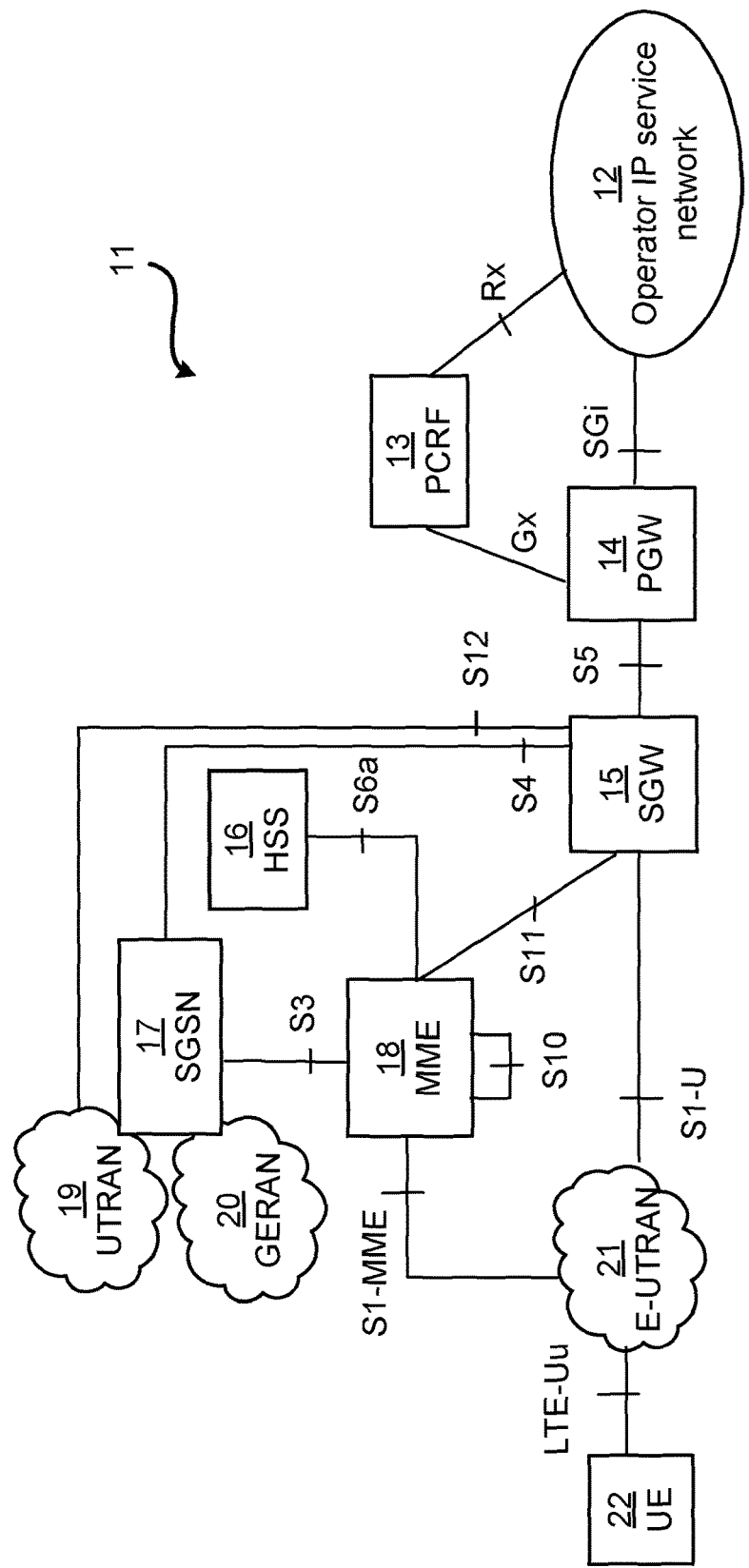
FIG. 1 is a schematic diagram illustrating a communication network according to some embodiments.

FIG. 1 shows a schematic overview of an exemplifying communication network 11. The communication network 11 is a so called LTE based system. It should be pointed out that the terms "LTE" and "LTE based" system is here used to comprise both present and future LTE based systems, such as, for example, advanced LTE systems. It should be appreciated that although FIG. 1 shows a communication network 11 in the form of a LTE based system, the example embodiments herein may also be utilized in connection with other communication networks comprising nodes and functions that correspond to the nodes and functions of the communication network 11 in FIG. 1.

Figure 9:
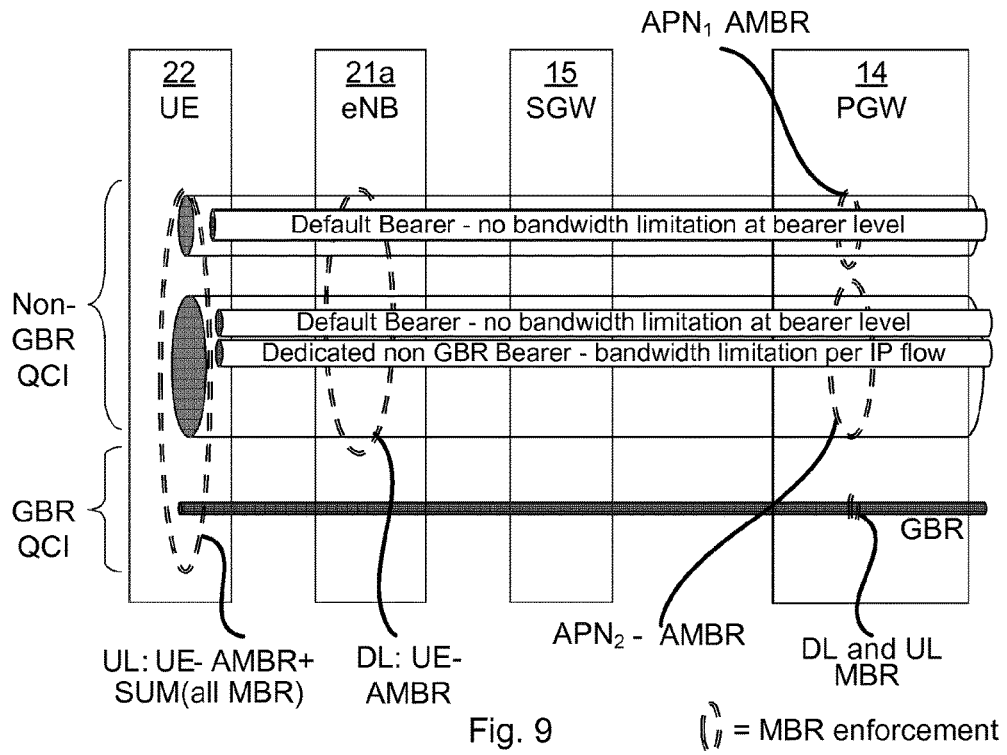
FIGS. 9, 10 and 11 are schematic illustrations of bearers in the evolved packet system.

The communication system 11 comprises a radio base station in the form of an eNodeB 21a (not shown in FIG. 1, but in FIGS. 9-11), operatively connected to a Serving Gateway (SGW) 15, in turn operatively connected to a Mobility Management Entity (MME) 18 and a Packet Data Network Gateway (PGW), 14 which in turn is operatively connected to a Policy and Charging Rules Function (PCRF) 13.

The eNodeB is a radio access node that interfaces with a radio terminal 22, which is denoted User Equipment (UE) in LTE. The eNodeBs of the system forms the radio access network E-UTRAN 21 for LTE. The E-UTRAN 21 comprises the eNodeN 21a. The SGW 15 routes and forwards user data packets, whilst also acting as the mobility anchor for the user plane during inter-eNodeB handovers and as the anchor for mobility between LTE and other 3GPP technologies (terminating S4 interface and relaying the traffic between 3G/2G systems (the Universal Terrestrial Radio Access Network (UTRAN) 19, and the GSM EDGE Radio Access Network (GERAN) 20), where GSM is the Global System for Mobile Communications and where EDGE is short for Enhanced Data rates for GSM Evolution) and the PGW 14). For idle state UEs, the SGW 15 terminates the downlink (DL) data path and triggers paging when DL data arrives for the UE. It manages and stores UE contexts, e.g. parameters of the Internet Protocol (IP) bearer service, network internal routing information. It also performs replication of the user traffic in case of lawful interception.

The MME 18 is responsible for idle mode UE tracking and paging procedure including retransmissions. It is involved in the bearer activation/deactivation process and is also responsible for choosing the SGW 15 for a UE 22 at the initial attach and at time of intra-LTE handover involving Core Network (CN) node relocation. It is responsible for authenticating the user (by interacting with the HSS 16). Non-Access Stratum (NAS) signaling terminates at the MME 18 and it is also responsible for generation and allocation of temporary identities to UEs 22. It checks the authorization of the UE 22 to camp on the service provider's Public Land Mobile Network (PLMN) and enforces UE roaming restrictions. The MME 18 is the termination point in the network for ciphering/integrity protection for NAS signaling and handles the security key management. Lawful interception of signaling is also supported by the MME 18. The MME 18 also provides the control plane function for mobility between LTE and 2G/3G access networks with the S3 interface terminating at the MME 18 from the serving GPRS support node (SGSN) 17. The MME 18 also terminates the S6a interface towards the home HSS 16 for roaming UEs.

The MME 18 is operatively connected to the eNodeB 21a and the SGW 15. The traffic handled by those connections (i.e., over the S1-MME and S11 interfaces, respectively) is control plane traffic.

The Home Subscriber Server (HSS) 16, is a master user database that supports the IP Multimedia Core Network Subsystem (IMS) network entities that actually handle calls. It contains subscription-related information (subscriber profiles), performs authentication and authorization of the user, and can provide information about the subscriber's location and IP information.

The PGW 14 provides connectivity to the UE 22 to external packet data networks (PDN), such as and operator IP service network 12, by being the point of exit and entry of traffic for the UE 22. The PDN is typically associated with and/or identified by an Access Point Name (APN). A UE 22 may have simultaneous connectivity with more than one PGW 14 for accessing multiple packet data networks. The PGW 14 performs policy enforcement, packet filtering for each user, charging support, lawful Interception and packet screening. Another role of the PGW is to act as the anchor for mobility between 3GPP and non-3GPP technologies such as WiMAX and 3GPP2 (CDMA 1x and EvDO).

The PCRF 13 determines policy rules in real-time with respect to the UEs of the communications network 11. This may e.g., include aggregating information in real-time to and from the core network and operational support systems etc. of the system so as to support the creation of rules and/or automatically making policy decisions for UEs 22 currently active in the communications network 11 based on such rules or similar. The PCRF 13 provides the PGW 14 with such rules and/or policies or similar to be used by the acting PGW 14 as a Policy and Charging Enforcement Function (PCEF).

Hence a UE 22 is able to access services and data as provided by the packet data network 12. These services may be associated with different limitations on the bandwidth given to the UE 22 for accessing the services and downloading the data provided.

The embodiments disclosed herein relate to bandwidth limitation of Mobile Broadband (MBB) subscription services associated with a UE 22. In order to obtain such bandwidth limitation there is provided a PGW 14, a method performed by the PGW 14, a computer program comprising code, for example in the form of a computer program product, that when run on the PGW 14, causes the PGW 14 to perform the method. In order to obtain such bandwidth limitation there is further provided a PCRF 13, a method performed by the to PCRF 13, a computer program comprising code, for example in the form of a computer program product, that when run on the PCRF 13, causes the PCRF 13 to perform the method.

FIG. 2a schematically illustrates, in terms of a number of functional modules, the components of a PGW 14 according to an embodiment. A processing unit 23 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 29a (as in FIG. 4), e.g. in the form of a storage medium 25. Thus the processing unit 23 is thereby arranged to execute methods as herein disclosed. The storage medium 25 may also comprise persistent storage, which, for example, can be any single one or combination of magnetic memory, optical memory, solid state memory or even remotely mounted memory. The PGW 14 further comprises a communications interface 24 for communications with other entities in the communications network 11. As such the communications interface 22 may comprise one or more interfaces, comprising analogue and digital components and a suitable number of ports. The processing unit 23 controls the general operation of the PGW 14 e.g. by sending data and control signals to the communications interface 24 and the storage medium 25, by receiving data and reports from the communications interface 24, and by retrieving data and instructions from the storage medium 25. Other components, as well as the related functionality, of the PGW 14 are omitted in order not to obscure the concepts presented herein.

FIG. 2b schematically illustrates, in terms of a number of functional units, the components of a PGW 14 according to an embodiment. The PGW 14 of FIG. 2b comprises a number of functional units; a receive unit 23a, and an enforcement unit 23b. The PGW 14 of FIG. 2b may further comprises a number of optional functional units, such as any of an associate unit 23c, a calibrate unit 23d, and an add unit 23e. The functionality of each functional unit 23a-e will be further disclosed below in the context of which the functional units may be used. In general terms, each functional unit 23a-e may be implemented in hardware or in software. The processing unit 23 may thus be arranged to from the storage medium 25 fetch instructions as provided by a functional unit 23a-e and to execute these instructions, thereby performing any steps as will be disclosed hereinafter.

FIG. 3a schematically illustrates, in terms of a number of functional modules, the components of a PCRF 13 according to an embodiment. A processing unit 26 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 29b (as in FIG. 4), e.g. in the form of a storage medium 28. Thus the processing unit 26 is thereby arranged to execute methods as herein disclosed. The storage medium 28 may also comprise persistent storage, which, for example, can be any single one or combination of magnetic memory, optical memory, solid state memory or even remotely mounted memory. The PCRF 13 further comprises a communications interface 27 for communications with other entities in the communications network 11. As such the communications interface 27 may comprise one or more interfaces, comprising analogue and digital components and a suitable number of ports. The processing unit 26 controls the general operation of the PCRF 13 e.g. by sending data and control signals to the communications interface 27 and the storage medium 28, by receiving data and reports from the communications interface 27, and by retrieving data and instructions from the storage medium 28. Other components, as well as the related functionality, of the PCRF 13 are omitted in order not to obscure the concepts presented herein.

FIG. 3b schematically illustrates, in terms of a number of functional units, the components of a PCRF 13 according to an embodiment. The PCRF 13 of FIG. 3b comprises a functional units; a provide unit 26a. The PCRF 13 of FIG. 3b may further comprises a number of optional functional units, such an include unit 26b. The functionality of each functional unit 26a-b will be further disclosed below in the context of which the functional units may be used. In general terms, each functional unit 26a-b may be implemented in hardware or in software. The processing unit 26 may thus be arranged to from the storage medium 28 fetch instructions as provided by a functional unit 26a-b and to execute these instructions, thereby performing any steps as will be disclosed hereinafter.

Figure 4:
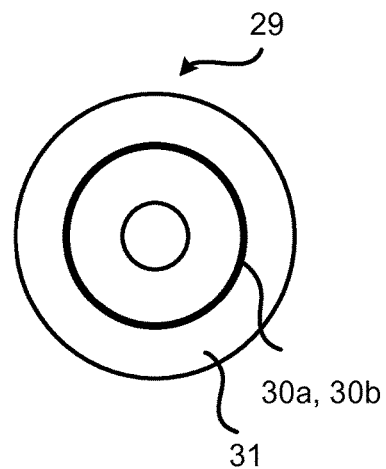
FIG. 4 shows one example of a computer program product comprising computer readable means according to an embodiment.
Figure 5:
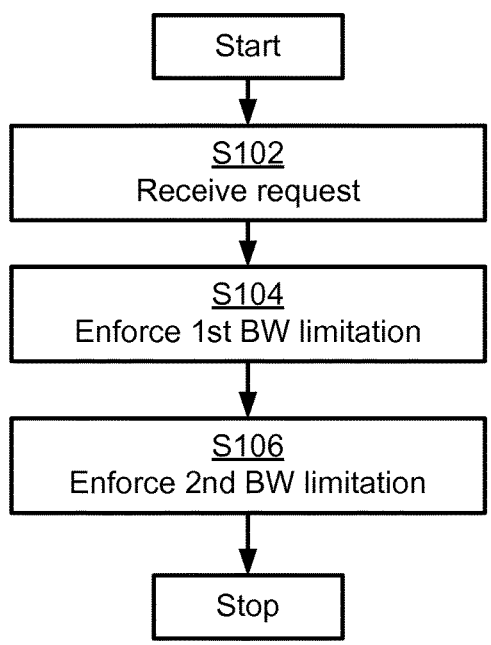
Figure 6:
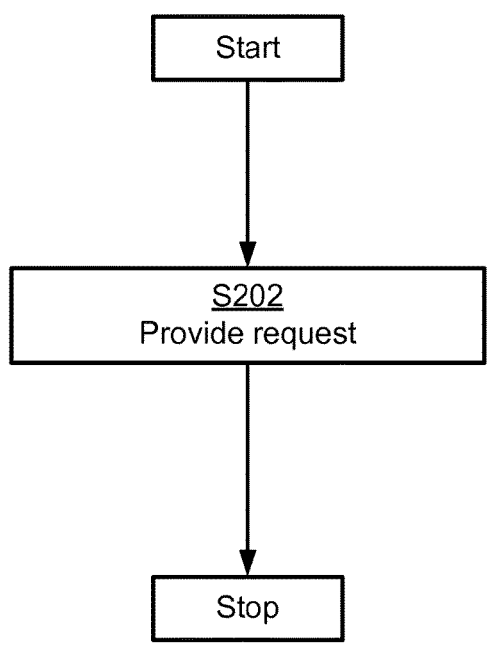

FIGS. 5 and 7 are flow chart illustrating embodiments of methods for bandwidth limitation of a UE 22 as performed by the PGW 14. FIGS. 6 and 8 are flow chart illustrating embodiments of methods for bandwidth limitation of a UE 22 as performed by the PCRF 13. The methods are advantageously provided as computer programs 30a, 30b. FIG. 4 shows one example of a computer program product 29a, 29b comprising computer readable means 31. On this computer readable means 31, a computer program 30a, 30b can be stored, which computer program 30a can cause the processing unit 23 and thereto operatively coupled entities and devices, such as the communications interface 24 and the storage medium 25 to execute methods according to embodiments described herein, and which computer program 30b can cause the processing unit 26 and thereto operatively coupled entities and devices, such as the communications interface 27 and the storage medium 28 to execute methods according to embodiments described herein. The computer program 30a, 30b and/or computer program product 29a, 29b may thus provide means for performing any steps as herein disclosed.

In the example of FIG. 4, the computer program product 29a, 29b is illustrated as an optical disc, such as a CD (compact disc) or a DVD (digital versatile disc) or a Blu-Ray disc. The computer program product 29a, 29b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 30a, 30b is here schematically shown as a track on the depicted optical disk, the computer program 30a, 30b can be stored in any way which is suitable for the computer program product 29a, 29b.

Reference is now made to FIG. 5 illustrating a method for enforcing a bandwidth limitation of MBB subscription services for a UE with respect to an access point name (APN) served by a packet data gateway (PGW) in a communications network according to an embodiment. The method is performed by the PGW 14. The processing unit 23 of the PGW is arranged to, in a step S102, receive a request to separate bandwidth limitation with respect to the APN for a connectivity service and a specific service delivered over the connectivity service. This request is by the PGW performed by enforcing a first bandwidth limitation and a second bandwidth limitation. The processing unit 23 of the PGW is arranged to, in a step S104, enforce a first bandwidth limitation on the connectivity service. The processing unit 23 of the PGW is arranged to, in a step S106, enforce a second bandwidth limitation on the specific service. Different bandwidth limitations are thereby enforced on the connectivity service and the specific service. In this way it is possible to enforce a first bandwidth limitation on the connectivity service, which may correspond to a bandwidth allowed by a subscription associated with the user equipment, whilst simultaneously enforcing a second bandwidth on the specific service, which may correspond to a bandwidth allowed by a sponsored service associated with the user equipment. This prevents any "free ride" effect, as mentioned in the background section.

Reference is now made to FIG. 6 illustrating a method for enforcing a bandwidth limitation of MBB subscription services for a UE with respect to an access point name (APN) served by a packet data gateway (PGW) in a communications network according to an embodiment. The method is performed by a policy and charging rules function (PCRF) 13 entity.

The processing unit 26 of the PCRF entity is arranged to, in a step S202, to provide a request to said PGW to separate bandwidth limitation with respect to the APN for a connectivity service and a specific service delivered over the connectivity service. The request involves enforcing a first bandwidth limitation (e.g. corresponding to a bandwidth allowed by a subscription associated with the user equipment) on the connectivity service and enforcing a second bandwidth limitation (e.g. corresponding to a bandwidth allowed by a sponsored service provided for the user equipment) on the specific service. The PCRF entity may thereby request the PGW to perform bandwidth limitation enforcement.

There may be different ways of relating the first bandwidth limitation to the second bandwidth limitation. According to an embodiment the second bandwidth limitation is higher than the first bandwidth limitation.

There may be different types of connectivity services. Different embodiments relating thereto will now be described in turn. According to an embodiment the connectivity service is a mobile broadband connectivity service. According to an embodiment the connectivity service is a mobile broadband subscription service of the user equipment. The mobile broadband subscription service may comprise the mobile broadband connectivity service.

There may be different types of specific services. Different embodiments relating thereto will now be described in turn. According to an embodiment the specific service comprises specific service content, e.g. in the form of a sponsored service. According to an embodiment the specific service is delivered as a dedicated non-guaranteed bit rate (non-GBR) connectivity service. The specific service content may be delivered as the non-GBR connectivity service. The specific service may be provided by a mobile broadband connectivity service provider of the user equipment or by a third party service provider.

There may be different ways to receive the request in step S102. Different embodiments relating thereto will now be described in turn. According to an embodiment the request is received on a Gx interface. According to an embodiment the request is received from a Policy and Charging Rules Function (PCRF) 13 entity in the communications network. Alternatively the request is received from a Charging System (CS) in the communications network.

Embodiments relating to further details of bandwidth limitation of MBB subscription services with respect to an APN will now be disclosed. Reference is now made to FIG. 7 and FIG. 8 illustrating methods for bandwidth limitation of MBB subscription services with respect to an APN according to further embodiments.

As noted above the limitation in bit rate for the subscription and the bit rate that may be set for a specific nonGBR service may be separated. There may be different ways to enforce the first bandwidth limitation (as in step S104) and to enforce the second bandwidth limitation (as in step S106). Different embodiments relating thereto will now be described in turn.

Two overall embodiments are disclosed to enable the possibility of increasing the maximum bit rate for a specific (sponsored) non-GBR traffic (e.g. application or service or flow), without incurring in the risk of an involuntary increase of the experienced maximum bit rate of other non-specific/non-sponsored nonGBR traffic.

According to the first overall embodiment the bandwidth limitation for the default traffic on mobile broadband connections governed by an Evolved Packet Core (EPC) is enforced by using a parameter, the "Default Maximum Bit Rate", $MBR_{Default}$, applied to limit the bandwidth of the nonGBR default bearer for the specific APN. The existing APN-AMBR may still be applied to the aggregate of all nonGBR traffic to/from the subscriber's UE for the APN in question, including the nonGBR default bearer. According to an to embodiment the processing unit 26 of the PCRF is arranged to, in an optional step S204, include the $MBR_{Default}$ parameter in the request (as in step S202)

The connectivity service may be associated with a default bearer and the specific service may be associated with a dedicated bearer different from the default bearer. The request may comprise a default maximum bitrate parameter determining the first bandwidth limitation. According to an embodiment the processing unit 23 of the PGW is arranged to, in an optional step S104a, enforce the first bandwidth limitation on the default bearer associated with the connectivity service; and, in an optional step S106a, enforce the second bandwidth limitation on the dedicated bearer associated with the specific service.

The existing APN-AMBR may be calibrated. According to an embodiment the processing unit 23 of the PGW is therefore arranged to, in an optional step S108a, calibrate an APN-AMBR, parameter to a bit rate level that comprises the first bandwidth limitation and the second bandwidth limitation; and, in an optional step S108b, enforce the APN-AMBR on the connectivity service and the specific service. The APN-AMBR value may thus determine the upper limit for all nonGBR bearers associated with the UE and the specific APN in question, i.e., both the default bearer (i.e. the connectivity service) and the dedicated bearer (i.e. the specific service).

In more detail, for a specific APN, in addition to the APN-AMBR value, an Attribute Value Pair (AVP) to be sent over the Gx interface located between the PCEF and the PCRF is introduced. This AVP, the $MBR_{Default}$, allows to introduce and enforce a Maximum Bit Rate on the nonGBR default bearer. A bandwidth limitation corresponding to the MBR indicated by the $MBR_{Default}$ is then applied to the nonGBR default bearer for the specific APN. The APN-AMBR value may be calibrated not to limit the $MBR_{Default}$ or the MBR of a specific/sponsored non-GBR traffic (application/service/flow).

The new information element may accompany the normal QoS information sent between the PCRF and the PCEF (i.e. the PGW) over the Gx interface, see the 3GPP specification TS 29.213 V2.1.0 (2013-09) Section 4.1, Figure 4.1.1, message 12; and Section 4.3.1.1, Figure 4.3.1.1.1, message 6; and Section 4.3.2.1, Figure 4.3.2.1.1, message 13.

Thus, a first bandwidth limitation may be enforced on the nonGBR default bearer of the APN, and a separate independent higher bandwidth limitation may be enforced on a dedicated nonGBR bearer carrying sponsored service/traffic on the same APN. The aggregated traffic of the nonGBR default bearer and the dedicated nonGBR bearer may fall within the APN-AMBR value applied to the aggregate of all nonGBR traffic to/from the subscriber's UE for the APN. If not, then the APN-AMBR value may be temporarily increased so as to accommodate the dedicated nonGBR bearer carrying the sponsored service/traffic.

Other dedicated NonGBR bearers (regardless if sponsored or not sponsored) may still be limited in bandwidth by the MBR at IP flow level. Here, any "free ride" effect is prevented as the bandwidth limitations applicable for non-GBR bearers are set independently for the sponsored non-GBR services and for all other services. The "free ride" effect may thus be prevented by enforcing a subscription bandwidth limitation on the default bearer up to the $MBR_{default}$. The APN-AMBR becomes nearly obsolete with this approach.

Figure 10:
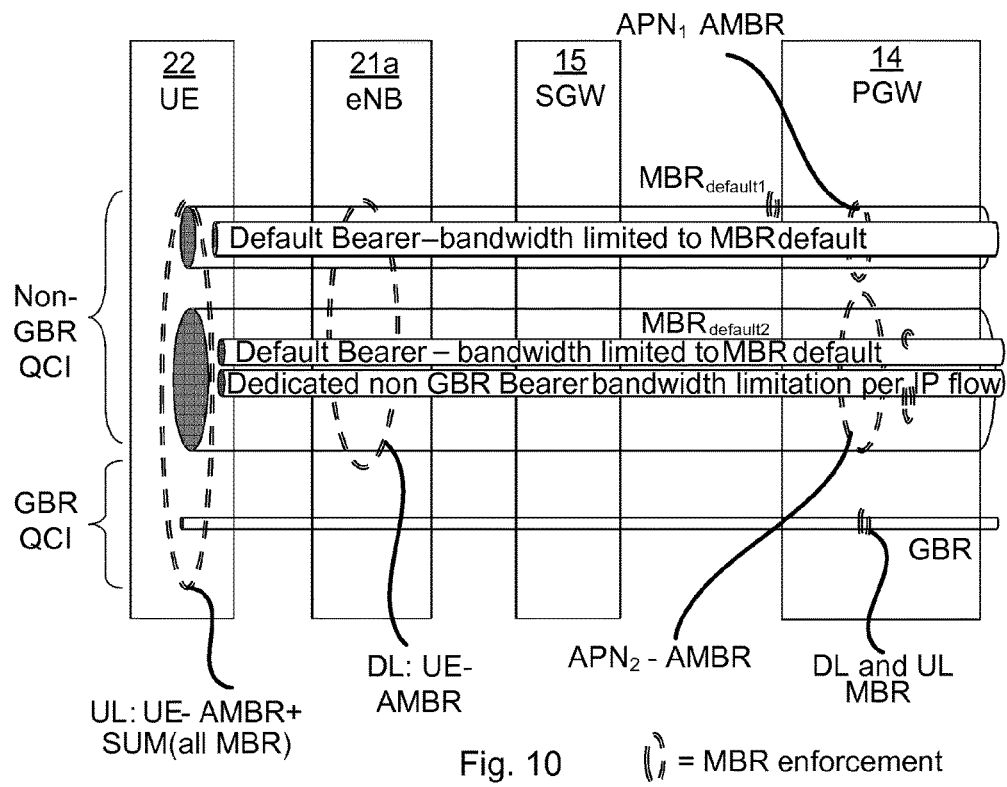

In summary, according to the first overall embodiment the PCRF may transmit the "Default Maximum Bit Rate", $MBR_{Default}$ to the PCEF (i.e. PGW). The PGW receives the $MBR_{Default}$ from the PCRF and applies the bandwidth limitation indicated by the $MBR_{Default}$ to limit the bandwidth of the default bearer for a specific APN. The transmission of the $MBR_{Default}$ may be performed at bearer establishment and/or bearer modification. Sponsored traffic will be carried on dedicated bearers with an MBR independent from the $MBR_{Default}$. FIG. 10 schematically illustrates enforcement of bearers in the evolved packet system (EPS) according to the first overall embodiment.

According to the second overall embodiment, it is proposed to allow the establishment of nonGBR bearers for sponsored services/traffic with an MBR value that causes the APN-AMBR to be exceeded for those bearers. Sponsored traffic carried by those bearers is not included in the APN-AMBR enforcement for the subscriber's traffic on the APN in question. In general terms, The APN-AMBR is not modified by the addition of new bearers. The APN-AMBR indicates what is the maximum bit rate that the subscriber can obtain on that APN for all nonGBR services. As an example, consider services "A", "B", and "C", each with an MBR value ($MBR_A$, $MBR_B$, and $MBR_C$, respectively) that is lower than the APN-AMBR. The APN-AMBR value will have to be fulfilled although $MBR_A+MBR_B+MBR_C>$APN-AMBR. Particularly, in a case the connectivity service is associated with a default bearer and the specific service is associated with a dedicated bearer different from the default bearer, the processing unit 23 of the PGW may be arranged to, in an optional step S110, add the dedicated bearer for only transporting the specific service. Further, according to an embodiment the processing unit 23 of the PGW is arranged to, in an optional step S112, enforce an APN-AMBR parameter on the connectivity service and the specific service such that the specific dedicated bearer is excluded from the enforcement of the APN-AMBR parameter.

The request may comprise policy and charging control (PCC) rules. According to an embodiment the processing unit 26 of the PCRF is thus arranged to, in an optional step S206, include at least one PCC rule in the request (as in step S202). According to an embodiment the processing unit 23 of the PGW is arranged to, in an optional step S114, associate each PCC rule with a respective bearer.

In more detail, the PCEF (i.e. the PGW) is allowed, based on already existing QoS information sent from the PCRF over the Gx interface, to interpret whether the MBR part of a PCC rule with a nonGBR QoS should be excluded from the APN-AMBR enforcement (i.e., excluded from the APN-AMBR calculation). One PCC rule (comprising a MBR value) may be associated with only one bearer. A bearer is associated with only one APN. If the aggregated MBR value from all the PCC rules, each associated with a bearer for a specific APN, is lower than the APN-AMBR for the APN, then the flows in the bearers indicated by the PCC rules will be considered to be within the rate limitation set by the APN-AMBR. If the aggregated MBR value from all the PCC rules exceeds the APN-AMBR for the APN in question, then the MBR part of the PCC rule(s) associated with nonGBR bearers carrying sponsored traffic will be excluded from the rate limit set by the APN-AMBR (i.e., the MBR part of the PCC rule(s) associated with nonGBR bearers carrying sponsored traffic is/are excluded from the APN-AMBR calculation). The APN-AMBR bandwidth limitation will be applied to all other nonGBR bearers.

Thus, a first bandwidth limitation is enforced by the APN-AMBR with respect to the aggregated non-sponsored traffic to/from a subscriber terminal carried by the default bearer and all non-sponsored dedicated nonGBR bearers for a specific APN. A second bandwidth limitation that is not included in the APN-AMBR is enforced on a dedicated nonGBR bearer carrying sponsored service/traffic to the same APN. The first bandwidth may be higher or lower than the second bandwidth. Hence there is no need to temporarily increase the APN-AMBR value, since the second bandwidth is not included in the APN-AMBR value. However, it may be assumed that the APN-AMBR is still applied to the aggregated traffic occurring to/from the subscriber's UE on the default bearer and all non-sponsored dedicated nonGBR bearers for the APN in question.

The UE-AMBR may be adjusted to allow for including the support of the NonGBR MBR values exceeding the APN-AMBR value.

Figure 11:
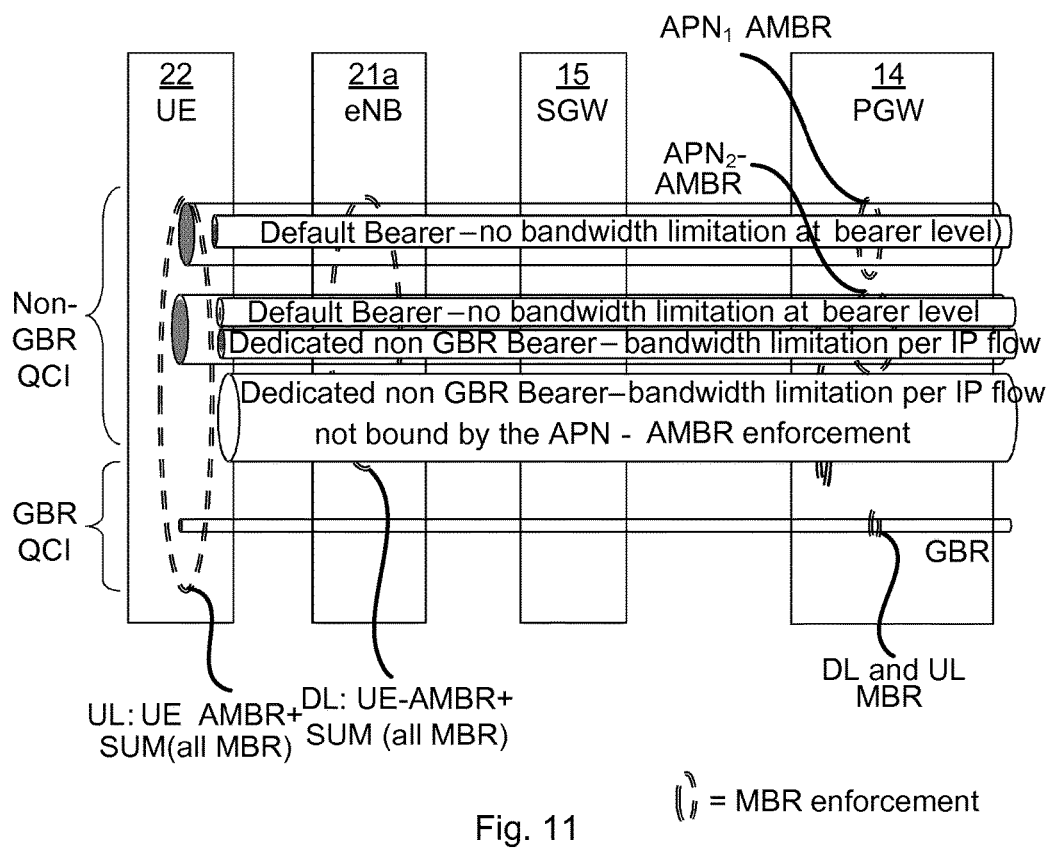

In summary, according to the second overall embodiment the PCRF may transmit already existing QoS information to the PCEF (i.e. the PGW) via the Gx interface. The PCRF may notify the PGW at bearer establishment and/or bearer modification that the dedicated nonGBR bearer now being created/modified is supposed to carry sponsored traffic, whereupon the PGW may act accordingly. If the MBR of the flows carried by the dedicated bearer exceed the limit set by the APN-AMBR, the dedicated bearer will be excluded from the limitation of the APN-AMBR. FIG. 11 schematically illustrates enforcement of bearers in the evolved packet system (EPS) according to the second overall embodiment.

Here, any "free ride" effect is prevented in that the APN-AMBR value is applied as in the existing EPC/LTE solution to all nonGBR bearers, and in that only dedicated nonGBR bearers carrying sponsored traffic for the APN in question are excluded from the calculation of the APN-AMBR value.

In general terms, whether a service/traffic carried by a dedicated nonGBR bearer is sponsored or not may be determined by the PCRF 13. Information indicating that a specific service is sponsored may e.g. be predetermined in the PCRF 13, e.g. set by the network operator using an Operation and Maintenance (OAM) function or similar. Additionally or alternatively, information indicating that a specific service is sponsored may e.g. be retrieved by the PCRF 13 from other entities in the communications network 11, e.g. entities comprising subscription information associated with the subscriber's UE. Additionally or alternatively, information indicating that a specific service is sponsored may e.g. be received by the PCRF 13 from an Application Function (AF). The AF may e.g. handle some or all functions of the service in question. The AF may e.g. provide information via the Rx interface to the PCRF 13 indicating that a specific service is sponsored for a particular subscriber's UE. The AF may provide information indicating that a specific service is sponsored when a subscriber's UE requests the service in question.

Some of the embodiments described above may be summarized in the following manner:

One embodiment is directed to a method for bandwidth limitation of a connectivity service for a user equipment with respect to an APN served by PGW in a communications network. The method is performed by the PGW, and comprises the steps of:

receiving a request to separate bandwidth limitation with respect to the APN for the connectivity service and a specific service delivered over the connectivity service;

enforcing a first bandwidth limitation on said connectivity service; and enforcing a second bandwidth limitation on said specific service.

The second bandwidth limitation may be higher than the first bandwidth limitation.

The connectivity service may be a mobile broadband connectivity service. The specific service may be a sponsored service, offering connectivity to a specific content charged separately from the existing subscription associated with the user equipment and/or offering connectivity to the specific content with a quality of service (QoS) that is different from the QoS associated with the existing subscription.

The connectivity service may be a mobile broadband subscription service of the user equipment.

The specific service may comprise specific service content.

The specific service may be delivered as a dedicated non-GBR connectivity service.

The specific service may be provided by a mobile broadband connectivity service provider of the user equipment or by a third party service provider.

The request may be received on a Gx interface.

The request may be received from a PCRF entity in the communications network.

The request may be received from a Charging System in the communications network.

The connectivity service may be associated with a default bearer and the specific service may be associated with a dedicated bearer different from said default bearer and the request may comprise a default maximum bitrate parameter determining said first bandwidth limitation. The method may then further comprise:
  enforcing said first bandwidth limitation on said default bearer associated with said connectivity service; and
  enforcing said second bandwidth limitation on said dedicated bearer associated with said specific service.

The method may further comprise:
  calibrating an access point name aggregated maximum bit rate, APN-AMBR, parameter to a bit rate level that comprises said first bandwidth limitation and said second bandwidth limitation
  enforcing said APN AMBR on said connectivity service and said specific service.

The connectivity service may be associated with a default bearer and the specific service may be associated with a dedicated bearer different from said default bearer. The method may then further comprise: adding said dedicated bearer for only transporting said specific service.

The method may further comprise: enforcing an APN-AMBR parameter on said connectivity service and said specific service such that said specific dedicated bearer is excluded from the enforcement of said APN-AMBR parameter.

The request may comprise policy and charging control, PCC, rules, were the method further comprises: associating each PCC rule with a respective bearer.

Some other embodiments described above may be summarized in the following manner:

Another embodiment is directed to method for bandwidth limitation of a connectivity service for a user equipment with respect to an APN served by a PGW in a communications network. The method being performed by a PCRF entity comprises the step of:
  providing a request to said PGW to separate bandwidth limitation with respect to the APN for the connectivity service and a specific service delivered over the connectivity service;
  wherein said request involves enforcing a first bandwidth limitation on said connectivity service and enforcing a second bandwidth limitation on said specific service.

Some other embodiments described above may be summarized in the following manner:

Another embodiment is directed to a PGW for bandwidth limitation of a connectivity service for a user equipment with respect to an APN served by the PGW, in a communications network. The PGW comprises a processing unit arranged to:
  receive a request to separate bandwidth limitation with respect to the APN for the connectivity service and a specific service delivered over the connectivity service;
  enforce a first bandwidth limitation on said connectivity service; and
  enforce a second bandwidth limitation on said specific service.

The second bandwidth limitation may be higher than the first bandwidth limitation.

The connectivity service is a mobile broadband connectivity service. The specific service may be a sponsored service, offering connectivity to a specific content charged separately from the existing subscription associated with the user equipment and/or offering connectivity to the specific content with a quality of service (QoS) that is different from the QoS associated with the existing subscription.

The connectivity service may be a mobile broadband subscription service of the user equipment.

The specific service may comprise specific service content.

The specific service may be delivered as a dedicated non-GBR connectivity service.

The specific service may be provided by a mobile broadband connectivity service provider of the user equipment or by a third party service provider.

The request may be received on a Gx interface.

The request may be received from a PCRF entity in the communications network.

The request may be received from a Charging System in the communications network.

The connectivity service may be associated with a default bearer and the specific service may be associated with a dedicated bearer different from said default bearer and said request may comprise a default maximum bitrate parameter determining said first bandwidth limitation. The processing unit may then be arranged to:
  enforce said first bandwidth limitation on said default bearer associated with said connectivity service; and
  enforce said second bandwidth limitation on said dedicated bearer associated with said specific service.

The processing unit may be arranged to:
  calibrate an APN-AMBR parameter to a bit rate level that comprises said first bandwidth limitation and said second bandwidth limitation
  enforce said APN AMBR on said connectivity service and said specific service.

The specific service may be associated with a dedicated bearer different from said default bearer, and the processing unit may then be arranged to: add said dedicated bearer for only transporting said specific service.

The processing unit may be arranged to: enforce an APN-AMBR parameter on said connectivity service and said specific service such that said specific dedicated bearer is excluded from the enforcement of said APN-AMBR parameter.

The request may comprise PCC rules and wherein the processing unit arranged to: associate each PCC rule with a respective bearer.

Some other embodiments described above may be summarized in the following manner:

Another embodiment is directed to a PCRF entity for bandwidth limitation of a connectivity service with respect to an APN served by a PGW in a communications network. The PCRF comprises a processing unit arranged to: provide a request to said PGW to separate bandwidth limitation with respect to the APN for the connectivity service and a specific service delivered over the connectivity service; wherein said request involves enforcing a first bandwidth limitation on said connectivity service and enforcing a second bandwidth limitation on said specific service.

Another embodiment is directed to a computer program for bandwidth limitation of a connectivity service for a user equipment with respect to an APN served by a PGW in a communications network, the computer program comprising computer program code which, when run on the PGW, entity, causes the PGW to:

receive a request to separate bandwidth limitation with respect to the APN for the connectivity service and a specific service delivered over the connectivity service;

enforce a first bandwidth limitation on said connectivity service; and enforce second bandwidth limitation on said specific service.

Another embodiment is directed to a computer program for bandwidth limitation of a connectivity service for a user equipment with respect to an APN served by a PGW in a communications network, the computer program comprising computer program code which, when run on a PCRF entity, causes the PCRF entity to:

provide a request to the PGW to separate bandwidth limitation with respect to the APN for the connectivity service and a specific service delivered over the connectivity service;

wherein said request involves enforcing a first bandwidth limitation on said connectivity service and enforcing a second bandwidth limitation on said specific service.

Another embodiment is directed to a computer program product comprising a computer program according to any of the embodiments mentioned above and a computer readable means on which the computer program is stored.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for bandwidth limitation of a connectivity service for a user equipment with respect to an access point name, APN, served by a packet data gateway, PGW, in a communications network, the method being performed by the PGW, comprising the steps of:

receiving a request to separate bandwidth limitation with respect to the APN for the connectivity service and a specific service delivered over the connectivity service, wherein said connectivity service is associated with a default bearer and said specific service is associated with a dedicated bearer different from said default bearer;

enforcing a first bandwidth limitation on said connectivity service;

enforcing a second bandwidth limitation on said specific service; and enforcing an access point name aggregated maximum bit rate, APN-AMBR, parameter on said connectivity service and said specific service such that said dedicated bearer is excluded from the enforcement of said APN-AMBR parameter.

2. The method according to claim 1, wherein the second bandwidth limitation is higher than the first bandwidth limitation.

3. The method according to claim 1, wherein said connectivity service is a mobile broadband connectivity service.

4. The method according to claim 1, wherein said connectivity service is a mobile broadband subscription service of the user equipment.

5. The method according to claim 1, wherein said specific service comprises specific service content.

6. The method according to claim 1, wherein said specific service is delivered as a dedicated non-guaranteed bit rate, non-GBR, connectivity service.

7. The method according to claim 1, wherein said specific service is provided by a mobile broadband connectivity service provider of the user equipment or by a third party service provider.

8. The method according to claim 1, wherein said request is received on a Gx interface.

9. The method according to claim 1, wherein said request is received from a Policy and Charging Rules Function, PCRF, entity in the communications network.

10. The method according to claim 1, wherein said request is received from a Charging System in the communications network.

11. The method according to claim 1, wherein said request comprises a default maximum bit rate parameter determining said first bandwidth limitation; the method further comprising:

enforcing said first bandwidth limitation on said default bearer associated with said connectivity service; and enforcing said second bandwidth limitation on said dedicated bearer associated with said specific service.

12. The method according to claim 1, further comprising:

calibrating an access point name aggregated maximum bit rate, APN-AMBR, parameter to a bit rate level that comprises said first bandwidth limitation and said second bandwidth limitation; and enforcing said APN AMBR on said connectivity service and said specific service.

13. The method according to claim 1, the method further comprising:

adding said dedicated bearer for only transporting said specific service.

14. The method according to claim 1, wherein said request comprises policy and charging control, PCC, rules, the method further comprising:

associating each PCC rule with a respective bearer.

15. A method for bandwidth limitation of a connectivity service for a user equipment with respect to an access point name, APN, served by a packet data gateway, PGW, in a communications network, the method being performed by a policy and charging rules function, PCRF, entity, comprising the step of:

transmitting a request to said PGW to separate bandwidth limitation with respect to the APN for the connectivity service and a specific service delivered over the connectivity service, wherein said connectivity service is associated with a default bearer and said specific service is associated with a dedicated bearer different from said default bearer;

wherein said PGW is configured to enforce a first bandwidth limitation on said connectivity service, enforce a second bandwidth limitation on said specific service, and enforce an access point name aggregated maximum bit rate, APN-AMBR, parameter on said connectivity service and said specific service such that said dedicated bearer is excluded from the enforcement of said APN-AMBR parameter.

16. A packet data network gateway, PGW, for bandwidth limitation of a connectivity service for a user equipment with respect to an access point name, APN, served by the PGW, in a communications network, comprising:
   memory; and
   processing circuitry coupled to the memory, the processing circuitry configured to:
      receive a request to separate bandwidth limitation with respect to the APN for the connectivity service and a specific service delivered over the connectivity service, wherein said connectivity service is associated with a default bearer and said specific service is associated with a dedicated bearer different from said default bearer;
      enforce a first bandwidth limitation on said connectivity service;
      enforce a second bandwidth limitation on said specific service; and
      enforce an access point name aggregated maximum bit rate, APN-AMBR, parameter on said connectivity service and said specific service such that said dedicated bearer is excluded from the enforcement of said APN-AMBR parameter.

17. The PGW according to claim 16, wherein the second bandwidth limitation is higher than the first bandwidth limitation.

18. The PGW according to claim 16, wherein said connectivity service is a mobile broadband connectivity service.

19. The PGW according to claim 16, wherein said connectivity service is a mobile broadband subscription service of the user equipment.

20. The PGW according to claim 16, wherein said specific service comprises specific service content.

21. The PGW according to claim 16, wherein said specific service is delivered as a dedicated non-guaranteed bit rate, non-GBR, connectivity service.

22. The PGW according to claim 16, wherein said specific service is provided by a mobile broadband connectivity service provider of the user equipment or by a third party service provider.

23. The PGW according to claim 16, wherein said request is received on a Gx interface.

24. The PGW according to claim 16, wherein said request is received from a Policy and Charging Rules Function, PCRF, entity in the communications network.

25. The PGW according to claim 16, wherein said request is received from a Charging System in the communications network.

26. The PGW according to claim 16, wherein said request comprises a default maximum bit rate parameter determining said first bandwidth limitation; wherein the processing circuitry is further configured to:
   enforce said first bandwidth limitation on said default bearer associated with said connectivity service; and
   enforce said second bandwidth limitation on said dedicated bearer associated with said specific service.

27. The PGW according to claim 16, wherein the processing circuitry is further configured to:
   calibrate an access point name aggregated maximum bit rate, APN-AMBR, parameter to a bit rate level that comprises said first bandwidth limitation and said second bandwidth limitation; and enforce said APN AMBR on said connectivity service and said specific service.

28. The PGW according to claim 16, wherein the processing circuitry is further configured to:
   add said dedicated bearer for only transporting said specific service.

29. The PGW according to claim 16, wherein said request comprises policy and charging control, PCC, rules, and wherein the processing unit is arranged to: associate each PCC rule with a respective bearer.

30. A policy and charging rules function, PCRF, entity for bandwidth limitation of a connectivity service with respect to an access point name, APN, served by a packet data gateway, PGW, in a communications network, comprising:
   memory;
   processing circuitry coupled to the memory, the processing circuitry configured to:
      transmit a request to said PGW to separate bandwidth limitation with respect to the APN for the connectivity service and a specific service delivered over the connectivity service,
   wherein said connectivity service is associated with a default bearer and said specific service is associated with a dedicated bearer different from said default bearer;
   wherein said PGW is configured to enforce a first bandwidth limitation on said connectivity service, enforce a second bandwidth limitation on said specific service, and enforce an access point name aggregated maximum bit rate, APN-AMBR, parameter on said connectivity service and said specific service such that said dedicated bearer is excluded from the enforcement of said APN-AMBR parameter.

31. A computer program stored on a non-transitory computer readable medium for bandwidth limitation of a connectivity service for a user equipment with respect to an access point name, APN, served by a packet data gateway, PGW, in a communications network, the computer program comprising computer program code which, when run on processing circuitry of the PGW, entity, causes the PGW to:
   receive a request to separate bandwidth limitation with respect to the APN for the connectivity service and a specific service delivered over the connectivity service, wherein said connectivity service is associated with a default bearer and said specific service is associated with a dedicated bearer different from said default bearer;
   enforce a first bandwidth limitation on said connectivity service;
   enforce a second bandwidth limitation on said specific service; and
   enforce an access point name aggregated maximum bit rate, APN-AMBR, parameter on said connectivity service and said specific service such that said dedicated bearer is excluded from the enforcement of said APN-AMBR parameter.

32. A computer program stored on a non-transitory computer readable medium for bandwidth limitation of a connectivity service for a user equipment with respect to an access point name, APN, served by a packet data gateway, PGW, in a communications network, the computer program comprising computer program code which, when run on processing circuitry of a policy and charging rules function, PCRF, entity, causes the PCRF entity to:
   transmit a request to a packet data network gateway, PGW, to separate bandwidth limitation with respect to the APN for the connectivity service and a specific service delivered over the connectivity service, wherein said connectivity service is associated with a default bearer and said specific service is associated with a dedicated bearer different from said default bearer;

wherein said PGW is configured to enforce a first bandwidth limitation on said connectivity service, enforce a second bandwidth limitation on said specific service, and enforce an access point name aggregated maximum bit rate, APN-AMBR, parameter on said connectivity service and said specific service such that said dedicated bearer is excluded from the enforcement of said APN-AMBR parameter.

* * * * *